United States Patent [11] 3,602,438

[72] Inventors Richard E. Driscoll
 Monroe;
 Charles H. McCallum, Swartz, both of, La.
[21] Appl. No. 15,924
[22] Filed Mar. 2, 1970
[45] Patented Aug. 31, 1971
[73] Assignee Cities Service Company
 New York, N.Y.

[54] ATTRITIONING OF CARBON BLACK
 6 Claims, No Drawings
[52] U.S. Cl. .................................................. 241/21
[51] Int. Cl. ........................................... B02c 15/00
[50] Field of Search ............................... 241/5, 15, 21, 38, 62, 16

[56] References Cited
 UNITED STATES PATENTS
2,453,557 11/1948 Voet .............................. 241/21 X
3,565,659 2/1971 Dickerson .................... 241/5 X Primary Examiner—Granville Y. Custer, Jr.
Attorneys—J. Richard Geaman and Elton F. Gunn ABSTRACT: Carbon black structure is reduced by grinding the black in a ball mill. The grinding rate is increased and the grinding energy requirement is reduced by moistening the black with oil. The proportion of oil to carbon black is generally within the range of about 5 to about 100 parts by weight of oil per 100 parts by weight of black.

ATTRITIONING OF CARBON BLACK

BACKGROUND OF THE INVENTION

Carbon blacks are characterized by a physical property known as structure, which can be generally described as a linking together of the particles into a chain during formation of the black. High structure blacks are characterized by the presence of long, extensively developed chains while low structure blacks exhibit little or no linking together e.g. the particles. Both high and low structure carbon blacks are useful, each type being suitable for different applications. High and intermediate structure blacks are made primarily by oil furnace processes while low structure blacks are produced by the thermal decomposition of natural gas in channel or thermal black processes. In rubber, carbon black structure has a significant effect upon the resultant modulus of the compound, i.e. modulus development will be relatively high or low in direct proportion to the structure level of the black. In most instances structure is measured by the liquid absorptive capacity of the black, e.g. linseed oil or dibutylphthalate absorption, since structure development can be directly related to this measurement.

It has recently been discovered that carbon blacks having desirable physical and chemical properties can be produced by the severe attritioning of blacks which have either high or intermediate structure. By means of such treatment the carbon structure chains can be broken up to a considerable degree, and the chemical activity of the black can also be enhanced since the number of active sites on the surface of the particles is increased by fracture of the chains. By heavy attritioning of intermediate or high structure oil furnace blacks, modified carbon blacks can be produced which resemble channel blacks, and which are therefore useful as substitutes for channel blacks in certain rubber compounds. Because of the high surface activity of these blacks, they sometimes impart performance to rubber which is superior to or unavailable from channel blacks.

It is known that the structure of carbon black can be reduced by passing the black through tightly compressed steel rolls, or by means of rotary or vibrating ball mills wherein the black is attrited by means of impact which occurs between rapidly moving steel balls. Although ball milling presently represents the best known approach to the mechanical reduction of carbon black structure, this method has nonetheless suffered from the drawback of insufficient grinding rate to the extent that it is largely uneconomical, i.e. the time and energy requirements for grinding the black to the desired level of reduced structure have been too great.

SUMMARY OF THE INVENTION

It is therefore an object of this invention to increase the rate at which carbon black can be ground in a ball mill.

Another object of this invention is to reduce the amount of energy required for grinding carbon black in a ball mill.

Even another object of this invention is to produce a carbon black having reduced structure by the ball milling of a structured carbon black.

Other objects and advantages of this invention will become apparent from the following description and the appended claims.

Heretofore, carbon black has been ground in a ball mill in either a substantially dry or a substantially wet state; i.e. while having a water content of less than about 20 percent by weight or considerably in excess of about 100 percent by weight. In the case of dry grinding, the bulk density of the carbon black being ground is not substantially increased and the black particles are subject to being thrown about as a loose dust within the grinding chamber. As such, it is difficult to entrap and crush the dispersed carbon black particles between the grinding media, and the grinding efficiency of the mill is thus quite low. If, on the other hand, large quantities of water are mixed with the black to the extent that a resilient paste or viscous slurry is formed, movement of the grinding media is considerably dampened and too much of the grinding energy is dissipated into the water rather than into the carbon black. In addition, it becomes necessary to remove excessively large amounts of water from a paste or slurry of carbon black when it is desirable that the finished product be in a substantially dry form.

In accordance with the present invention, the carbon black being ground is moistened with a rubber-processing oil to the extent that the particles are formed into a dense, powdery mass which can be further described as nondusting but which on the other hand is not so wet with the oil as to form a paste or slurry of the black. Accordingly, the grinding efficiency of the ball milling operation is greatly increased since the oil moistened particles can be acted upon to maximum advantage by the attritive forces of the grinding media, e.g. the rate of grinding can be increased several fold and the amount of energy required to grind each pound of black can be greatly reduced at the same time.

Generally, the proportion of rubber-processing oil to carbon black which can be used for carrying out the invention will fall within the range of about 5 to about 100 parts by weight of oil per 100 parts by weight of carbon black, but other proportions can be employed provided that dusting in the ball mill is significantly reduced without forming a paste or slurry of the black. Usually, the oil is not removed from the carbon black after the grinding thereof, but is left on the surface of the particles to become an ingredient of a rubber compound into which the ground black is incorporated. In such a case, the proportion of oil employed in grinding the black can be the same as is called for in the rubber compound; e.g. frequently from about 5 to about 50 parts by weight of oil per 100 parts by weight of black, although larger proportions of oil can also be employed.

The type of rubber-processing oil which can be used in the practice of the invention is subject to considerable variation since it may be selected from a wide variety of the so-called extension oils, plasticizing oils, and processing aids which may be, for example, a napthenic petroleum oil, an aromatic petroleum oil, a paraffinic petroleum oil, a low molecular weight polybutene or a vegetable oil.

The type of ball mill that is employed for grinding of the black is not essential to the invention since the grinding rate and/or energy requirements can be reduced with any given type. It will be understood that the term "ball mill" as used herein is intended to mean any grinding mill having an enclosed milling chamber that is partially filled with hard surfaced objects (the grinding media) such as balls, pebbles, rods, and the like, and whereupon moving the chamber the hard surfaced objects are caused to forcefully collide with one another so that the material being ground is to the attritioning effect of heavy impacts between objects. It will be appreciated that vibratory ball mills can be employed to advantage in the practice of this invention since they provide a grinding rate which is generally much faster than that which is available from a rotary mill.

DESCRIPTION OF PREFERRED EMBODIMENTS

EXAMPLE I

An intermediate structure HAF oil furnace black having a Stiff Paste Oil Absorption value of 13.2 gal./100 lbs. was ball milled in order to provide an attrition modified oil furnace black which could be used as a substitute for EPC channel black as a rubber reinforcing pigment. The HAF black was ground dry and also in accordance with the invention using a vibrating ball mill having a grinding chamber with a diameter of 15 inches and a length of 18 inches. The grinding media (steel balls) consisted of 70 pounds of ½ balls, 35 pounds of ⅝-inch balls, 140 pounds of ¾-inch balls and 105 pounds of 1-inch balls. Vibration frequency was 1,140 vibrations per minute; vibration amplitude was ¾-inch. Conditions and results of the grinding operations is shown in table I.

TABLE I

| Oil to black, ratio by weight | Grinding rate, lbs. per hour | Stiff paste oil absn., gal./100 lbs. | | | Volatile percent by weight (Pass 3) | Horsepower input to mill |
|---|---|---|---|---|---|---|
| | | Pass 1 | Pass 2 | Pass 3 | | |
| 0/100 (Dry) | 56.5 | 12.1 | 10.9 | 10.6 | 3.1 | 20.1 |
| 10/100 | 200 | 11.0 | | | 2.4 | 22.4 |
| 20/100 | 231 | 10.7 | | | 2.4 | 22.5 |

In the runs made in accordance with the invention, i.e. using 10 and 20 parts by weight of oil per 100 parts by weight of black, the oil was a napthenic petroleum oil (Circosol 42XH) which was sprayed onto a bed of the black, with gentle agitation, prior to passing the black to and through the ball mill. As can be seen from table 1, grinding the carbon black in accordance with the invention provided reduction in the structure of the black at a much faster rate. More specifically, reduction to a 10.7 gal./100 lb. oil absorption level was accomplished in only one pass through the mill at the 20/100 oil to black ratio whereas dry milling required two passes through the mill and could only be accomplished at about one-fourth the rate available from the invention. It should also be noted that the horsepower input to the mill was only slightly increased when the carbon black was ground in the presence of oil and this provided the additional benefit of greatly reducing the energy requirement for grinding each pound of black.

As previously indicated, the purpose of this experiment was to produce an attrited oil furnace black which would serve as a substitute for EPC channel black in a rubber compound. The ground carbon blacks and EPC black were thus compounded into rubber according to the following recipe:

| | Parts by Weight | | | |
|---|---|---|---|---|
| | 1 | 2 | 3 | 4 |
| Natural Rubber | 100.00 | 100.00 | 100.00 | 100.00 |
| Dry Ground Black | 55.00 | — | — | — |
| 10/100 Oil to Black | — | 60.00 | — | — |
| 20/100 Oil to Black | — | — | 65.00 | — |
| Micronex W-6[1] | — | — | — | 55.00 |
| Circosol 42xH[2] | 10.00 | 5.00 | — | 10.00 |
| Zinc Oxide | 3.00 | 3.00 | 3.00 | 3.00 |
| Stearic Acid | 2.50 | 2.50 | 2.50 | 2.50 |
| Santoflex[3] | 1.00 | 1.00 | 1.00 | 1.00 |
| B-L-E[4] | 1.00 | 1.00 | 1.00 | 1.00 |
| Vultrol[5] | 0.50 | 0.50 | 0.50 | 0.50 |
| Sulfur | 2.70 | 2.70 | 2.70 | 2.70 |
| Santocure NSR[6] | 0.50 | 0.50 | 0.50 | 0.50 |
| MBTS[7] | — | — | — | 0.70 |

[1] EPC black; Columbian Division, Cities Service Co.
[2] Napthenic rubber processing oil; Sun Oil Co.
[3] Antioxidant; Monsanto Co.
[4] Antioxidant; Uniroyal, Inc.
[5] Retarder; H. M. Royal, Inc.
[6] Accelerator; Monsanto Co.
[7] Benzothiazyl Disulfide accelerator.

After compounding, each of the stocks was cured at 293° F. and stress-strain and other properties of each were then determined. Results are shown in Table 2.

TABLE 2

| | 1 | 2 | 3 | 4 |
|---|---|---|---|---|
| | Dry ground | 10/100 oil to black | 20/100 oil to black | EPC |
| Carbon properties | | | | |
| Stiff paste O. A. | 10.6 | 11.0 | 10.7 | 12.9 |
| Volatile, percent by weight | 3.1 | 2.4 | 2.4 | 6.6 |
| Rubber properties | | | | |
| 20' L-300 modulus | 1,060 | 1,180 | 1,260 | 1,350 |
| 20' tensile strength | 3,450 | 3,730 | 3,730 | 4,050 |
| 60' L-300 modulus | 1,720 | 1,730 | 1,650 | 1,740 |
| 60' tensile strength | 3,670 | 3,850 | 3,810 | 3,860 |
| 60' elongation | 530 | 545 | 545 | 530 |
| 100' tensile strength | 3,050 | 3,600 | 3,460 | 3,720 |
| Max. tensile strength | 4,210 | 4,230 | 4,030 | 4,140 |
| Log R | 4.6 | 4.2 | 4.2 | 7.1 |
| Dispersion (visual) | 6.5 | 7.0 | 7.0 | 5.3 |
| Rebound (100', cure) | 70.4 | 69.0 | 68.1 | 69.3 |
| Goodrich heat build-up | 56.0 | 58.0 | 57.0 | 53.0 |

Compared to the dry-ground black (Composition 1), the carbon blacks ground in accordance with the invention (Compositions 2 and 3) exhibited better dispersion and somewhat higher tensile strength at the 60 and 100 minute cures. Compared to the EPC black (Composition 4), the carbon blacks ground in accordance with the invention exhibited comparable stress-strain properties, much better dispersion, lower Log R, about equal rebound, and a somewhat slower cure rate.

EXAMPLE II

Using the same vibrating ball mill and operating conditions as in Example I., except that the grinding media consisted of 350 lbs. of ⅝-inch steel balls, HAF carbon black having a Stiff Paste Oil Absorption Value of 13.2 gal./100 lbs. was ground in the presence of an aromatic (Sundex 8125) and a paraffinic (Sunpar 2100) rubber-processing oil. In each case the blacks were subjected to only one pass through the ball mill.

TABLE 3

| Black to Oil Ratio, by weight | Grinding Rate, Lbs. per hour, Dry Basis | Stiff Paste Oil Absorption, Gal./100 lbs. |
|---|---|---|
| 10/100 Aromatic | 212 | 10.2 |
| 20/100 Aromatic | 232 | 8.6 |
| 10/100 Paraffinic | 212 | 9.3 |
| 20/100 Paraffinic | 230 | 8.4 |

Compared to the results obtained with dry grinding in Example I, the greatly increased degree and rate of structure reduction which is available from the present invention is particularly apparent from table 3. When these carbon blacks were compounded into rubber using the same formulation as in example I, They exhibited comparable tensile strength, much better dispersion, higher rebound and about equal heat buildup, faster cure, and lower Log R, when compared to the EPC black.

In the foregoing experiments, the rubber processing oil was added to the carbon black before the latter was fed into the ball mill. It will be understood that the oil can, of course, be added to the black as it is being fed into the mill or even after the black has entered the grinding chamber.

While the invention has been described with reference to particular materials, conditions, apparatus, and the like, it will also be understood that various other embodiments will become apparent which are within the spirit and scope of the invention as defined in the appended claims.

We claim:

1. In a process for reducing the structure of carbon black by subjecting a structured carbon black to the attritioning action of a ball mill, the improvement which comprises attriting the carbon black in the form of a dense, powdery mass which is moistened with an amount a rubber-processing oil which is less than that required for forming a paste of the carbon black and continuing the attritioning of the moistened black until the structure thereof has been substantially reduced.

2. The process of claim 1 wherein the proportion of oil to carbon black is within the range of about 5 to about 100 parts by weight of oil per 100 parts by weight of carbon black.

3. The process of claim 1 wherein the proportion of oil to carbon black is within the range of about 5 to about 50 parts by weight of oil per 100 parts by weight of carbon black.

4. The process of claim 1 wherein the rubber process oil is selected from the group consisting of napthenic petroleum oils, aromatic petroleum oils, paraffinic petroleum oils, low molecular weight polybutenes, and vegetable oils.

5. The process of claim 1 wherein the ball mill is vigorously vibrated for attritioning of the carbon black.

6. The process of claim 1 wherein the structured carbon black is an intermediate structure oil furnace black or a high structure oil furnace black.